United States Patent
Dearlove et al.

(10) Patent No.: US 10,212,142 B2
(45) Date of Patent: Feb. 19, 2019

(54) SECRET COMMUNICATIONS

(71) Applicant: BAE SYSTEMS PLC, London (GB)

(72) Inventors: Christopher Mark Dearlove, Essex (GB); Alan Manuel Cullen, Essex (GB); Kenneth Graham Paterson, Surrey (GB); Jacob Chroeis Nakamura Schuldt, Ibaraki (JP)

(73) Assignee: BAE Systems plc, London (GB)

( * ) Notice: Subject to any disclaimer, the term of this patent is extended or adjusted under 35 U.S.C. 154(b) by 173 days.

(21) Appl. No.: 15/500,409

(22) PCT Filed: Jul. 31, 2015

(86) PCT No.: PCT/GB2015/052214
§ 371 (c)(1),
(2) Date: Jan. 30, 2017

(87) PCT Pub. No.: WO2016/016656
PCT Pub. Date: Feb. 4, 2016

(65) Prior Publication Data
US 2017/0222993 A1    Aug. 3, 2017

(30) Foreign Application Priority Data
Aug. 1, 2014    (GB) .................................. 1413651.9

(51) Int. Cl.
*H04L 29/06*    (2006.01)
*H04W 12/04*    (2009.01)
(Continued)

(52) U.S. Cl.
CPC .......... *H04L 63/061* (2013.01); *H04L 9/0891* (2013.01); *H04L 9/3073* (2013.01);
(Continued)

(58) Field of Classification Search
None
See application file for complete search history.

(56) References Cited

U.S. PATENT DOCUMENTS 6,396,928 B1 * 5/2002 Zheng .................. H04L 9/3013
380/283
8,108,678 B1 * 1/2012 Boyen .................. H04L 9/0847
380/30
(Continued)

FOREIGN PATENT DOCUMENTS

| CN | 102223629 B1 | 11/2013 |
| EP | 2493229 A1 | 8/2012 |
| WO | 2014017959 A1 | 1/2014 |

OTHER PUBLICATIONS

Lee, Sanghwan et al. A Practical Group Based Key Management Scheme for Ubiquitous Sensor Networks. The International Conference on Information Network 2012. https://ieeexplore.ieee.org/stamp/stamp.jsp?tp=&arnumber=6164370 (Year: 2012).*
(Continued)

*Primary Examiner* — Jeremiah L Avery
(74) *Attorney, Agent, or Firm* — Maine Cernota & Rardin

(57) ABSTRACT

A method of establishing a network by sharing a secret between a first entity (A) and a second entity (B), comprising the steps of: the first entity (A) broadcasting (100) an ANNOUNCE message announcing its identity and details of other entities it is aware of, wherein each of the other entities of which it is aware is associated with a particular nonce, and the message is encrypted using a broadcast encryption scheme common to the first and second entities (A,B), and; the second entity (B), upon receiving and decrypting the ANNOUNCE message, transmitting (110) to the first entity (A) a SHARE message, wherein the SHARE message comprises a signcryption of the secret, authenticated using
(Continued)

signcryption data associated with the particular nonce associated with the second entity (B).

13 Claims, 3 Drawing Sheets

(51) Int. Cl.
*H04L 9/08* (2006.01)
*H04L 9/30* (2006.01)
*H04W 84/18* (2009.01)

(52) U.S. Cl.
CPC .......... *H04W 12/04* (2013.01); *H04L 63/101* (2013.01); *H04L 2209/72* (2013.01); *H04W 84/18* (2013.01)

(56) References Cited

U.S. PATENT DOCUMENTS

| | | | |
|---|---|---|---|
| 8,510,560 B1 | 8/2013 | Lambert et al. | |
| 9,191,208 B2* | 11/2015 | Yagisawa | H04L 9/3066 |
| 2005/0089173 A1* | 4/2005 | Harrison | G06F 7/725 |
| | | | 380/277 |
| 2006/0026426 A1* | 2/2006 | Chen | H04L 9/3073 |
| | | | 713/168 |
| 2006/0059540 A1* | 3/2006 | Hammons | H04L 63/0823 |
| | | | 726/2 |
| 2006/0126832 A1* | 6/2006 | Takahashi | H04L 9/3073 |
| | | | 380/30 |
| 2010/0034382 A1* | 2/2010 | Xu | H04L 9/3066 |
| | | | 380/255 |
| 2010/0290622 A1* | 11/2010 | Garcia Morchon | H04W 12/04 |
| | | | 380/273 |
| 2012/0104001 A1 | 5/2012 | Kulzer | |
| 2013/0051551 A1* | 2/2013 | El Aimani | H04L 9/008 |
| | | | 380/30 |

OTHER PUBLICATIONS

Nguyen, Thuy Ngoc; Ma, Maode. Enhanced EAP-Based Pre-Authentication for Fast and Secure Inter-ASN Handovers in Mobile WiMAX Networks. IEEE Transactions on Wireless Communications, vol. 11, Issue: 6. https://ieeexplore.ieee.org/stamp/stamp.jsp?tp=&arnumber=6177972 (Year: 2012).*

Great Britain Search Report of Application No. GB1413651.9, dated Jan. 23, 2015, 4 pages.

International Search Report and Written Opinion of Apllication No. PCT/GB2015/052214, dated Nov. 9, 2015, 10 pages.

Jianping Pan et al: "Promoting Identity-Based Key Management in Wireless AdHoc Networks", In: "Wireless Network Security", Jan. 1, 2007, Springer US, Boston, MA, XP055223130, ISBN: 978-0-387-28040-0, pp. 83-102, DOI: 10.1007/978-0-387-33112-6_4, abstract, paragraph [II.A]-paragraph [IV.A].

Shamir Adi Ed—Kermarrec Yvon (Editor): "Identity-Based Cryptosystems and Signature Schemes", Jan. 1, 1901, Advances in Communication Networking: 20th Eunice/IFIP EG 6.2, 6.6 International Workshop, Rennes, France, Sep. 1-5, 2014, Revised Selected Papers; [Lecture Notes in Computer Science, ISSN 1611-3349], Springer Verlag, DE, pp. 47-53, XP047288160, ISSN: 0302-9743, ISBN: 978-3-642-36699-4, [retrieved on Nov. 24, 2000] p. 47, line 1-p. 51, line 33.

Yuliang Zheng: "Signcryption or How to Achieve CostSignature & Encryption CostSignature + CostEncryption", Mar. 29, 1999, XP055224516, Retrieved from the Internet: URL:http://webpages.uncc.edu/yzheng/publications/files/signcrypt.pdf [retrieved on Oct. 29, 2015], p. 8, line 35-p. 16, line 25.

Amos Foat et al: "Broadcast Encryption", Aug. 22, 1993, Advances in Cryptology (Crypto), Santa Barbara, Aug. 22-26, 1993; [Proceedings of the Annual International Cryptology Conference (Crypto)], Berlin, Springer, DE, pp. 480-491, XP019194081, ISBN: 978-3-540-57766-9, abstract, p. 481, line 1-p. 490, line 10.

International Preliminary Report on Patentability of Application No. PCT/GB2015/052214, dated Oct. 24, 2016, 17 pages.

* cited by examiner

SECRET COMMUNICATIONS

RELATED APPLICATIONS

This application is a National Phase application filed under 35 U.S.C. § 371 of PCT Application No. PCT/GB/052214 with an International filing date of Jul. 31, 2015, which claims priority to UK Application No. GB1413651.9, filed Aug. 1, 2014. Each of these applications is herein incorporated by reference in their entirety for all purposes.

The present invention relates to a method of sharing a secret between two entities which are not necessarily aware of each other before sharing the secret.

More particularly, but not exclusively, the present invention relates to ad hoc networks, and particularly to a bootstrapping mechanism of use in setting up such networks. Bootstrapping refers to the management of keys used in the subsequent encryption of routing messages in the network, and may also be used to support encryption of other packets. The key is a special instance of a secret which needs to be shared between entities.

Ad hoc networks may be used in a variety of different situations, ranging from commercial telecommunication networks to secure networks. Regardless of the end use of such ad hoc networks, certain features are common to all of them. By their very nature, since the networks are assembled and used without the routing topology being planned, as such, there is no controlling entity effectively in charge of routing signals and messages in the network.

In a very simple abstraction of an ad hoc network, it is possible to say that there is no preplanned means of getting a message from a first, source node to a second, destination node. This is in contrast to a more structured network where there is some form of managing entity which actively routes messages between different parties or nodes. In an ad hoc network, the routing of the messages is more dynamic in nature and the ultimate route taken is generally not known in advance.

FIG. 1 shows a simple illustration of an ad hoc network. If a node A wishes to communicate with a distant node D, it is necessary to relay any messages between A and D via an intermediate node B. Node A knows about node B and node C and has established links and, if required, communication protocols with these nodes, but cannot communicate directly with node D. However, node B can communicate with node D and may assist in passing a message from A to D.

Broadly speaking, ad hoc networks may be defined as either reactive or proactive. In a reactive ad hoc network, a route between nodes is found only when needed, i.e. only when a first node wishes to send a message to a second node. In such networks, a significant amount of time may be required to set up a route when one is needed.

In a proactive ad hoc network, there is some signalling between the various nodes of the network at all times so that a basic level of networked topology is always defined. Such a proactive ad hoc network may have a relatively higher level of administrative signalling overhead than a reactive ad hoc network.

An important feature of an ad hoc network is that only authorised parties are permitted to send and receive messages via the ad hoc network. In the case of a commercial communication network, for instance, this means that only valid subscribers are permitted to make and receive calls. In some circumstances, it is possible to pre-program the devices, which will be used to access the network with suitable credentials, to enable them to join the network and to send and receive messages. In other scenarios, it is desirable to carefully control those devices which are able to join the network and, in cases where a particular device has been compromised, to revoke its access to the network. This places an additional burden on the management of the network and poses a problem in most practical situations.

Furthermore, in setting up an ad hoc network, a particular problem is presented when it comes to the issue of maintaining the confidentiality of the participants in the network, and of the manner in which they are connected (the topology of the network). Encryption to protect this information comes with the additional problem that the participants may not themselves know who the other participants are. The simplest solution to this problem, sharing a single key among all participants, is vulnerable to the loss of that key, and furthermore, as there are no individual keys, it is not possible to exclude a compromised participant from the network, which may be done with individual keys that can be revoked.

It is an aim of embodiments of the present invention to provide a system which allows a first entity to establish a network by sharing a secret with a second entity in a secure manner, which reduces or minimises the possibility of the secret being decoded by an unauthorised party. More particularly, but not exclusively, embodiments of the invention aim to address issues with the setting up of an ad hoc network in a manner which ensures the security of all information about the network participants and their topology, and furthermore allows individual participants to be excluded from the network if that is required.

According to the present invention there is provided an apparatus and method as set forth in the appended claims. Other features of the invention will be apparent from the dependent claims, and the description which follows.

For a better understanding of the invention, and to show how embodiments of the same may be carried into effect, reference will now be made, by way of example, to the accompanying diagrammatic drawings in which.

Figure 1:
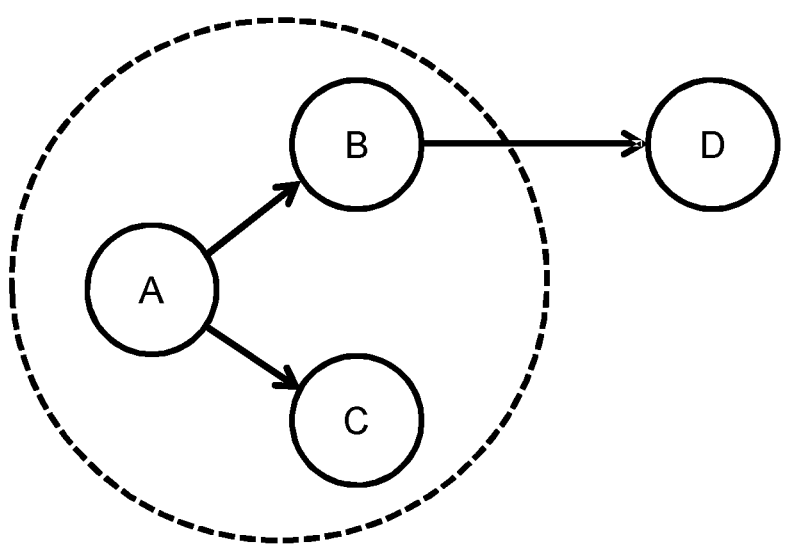
FIG. 1 shows a simple illustration of a prior art ad hoc network.

In order for two nodes in an ad hoc network to attempt to share a secret (i.e. a key), then they must be pre-initialised with a means for decrypting a broadcast message which comes from another node which is similarly pre-initialised.

A particular problem in the setup of an ad hoc network is that when a new node wishes to join the ad hoc network, it must announce its presence to any nearby nodes. These nodes may be unaware not just that the new node is about to join the network, but even of the existence of the new node. In principle, it is possible that an unauthorised third-party could listen in to these announcement or beacon messages, and other routing signalling messages, and, from them, it would be possible to determine at least some of the network topology. This, in itself, could pose a threat to the security of the ad hoc network. Ideally, it would be desirable for any messages involved in the setting up of the network to be entirely hidden from any eavesdropping third parties.

Certainly, it is highly desirable that no messages are transmitted in clear, which would enable a third party to intercept messages or otherwise interfere in the operation of the network.

The messaging which is required in order to set up an ad hoc network is especially vulnerable to interception and, if intercepted and decoded successfully, puts at risk any subsequent messages. As such, it is highly desirable that any bootstrapping messages, i.e. those involving key distribution, are not transmitted in clear.

The embodiments which are described herein are particular examples of sharing a secret between two entities, but the underlying concept has broader application and the skilled person will readily appreciate that key distribution is only one possible embodiment of the invention.

In an embodiment directed to ad hoc networks, in the event that a particular node is compromised, it is desirable that such a node may have its ability to operate within the network revoked. This fact means that it is not possible to simply equip all possible nodes in the network with the same pre-programmed information before they are sent into the field, because it would not then be possible to revoke any one particular node without affecting other similarly programmed nodes at the same time.

In order to ensure that control is maintained over the network and, in particular, to ensure that any particular node, which has been compromised may be revoked, it is necessary that each potential node has a unique identifier, which is linked to that node, and that node only. Hereafter, the identifier is referred to as an identity. Also, to ensure security, it is desirable that the unique identity for a particular node is not transmitted in clear. It is this requirement which causes particular difficulty, and which embodiments of the present invention seek to address.

Embodiments of the present invention are primarily concerned with setting up (bootstrapping) the security arrangements in an ad hoc network. The actual means by which messages are communicated between the nodes once the security arrangements have been set up are beyond the scope of this particular application and any suitable secure messaging protocol may be used.

Embodiments of the present invention enable a particular node to discover the identities of neighbouring nodes, nodes that it can communicate directly with, and to securely distribute, and possibly subsequently update, a local area key (LAK) to those nodes, without sending any identity information that is not encrypted. These LAKs will then be used to encrypt all of the messages that are used to establish the ad hoc network, such as the previously mentioned beacon messages. In order to allow the necessary encryption of the messages that make the LAKs available, each node is configured by a trusted authority with a public key (PK) that is the same for all nodes, and a private (secret) key SK that is specific to that node, and based on an identity ID assigned to that node. The trusted authority is required only to create these public and private keys, which will be distributed by a secure channel to each node. Nodes can be independently initialised in this manner, without knowledge of any other nodes, other than that each node must have a unique identity. In a realisation of this invention, those identities are numbers in the range 1 to N, for some chosen N (the maximum possible number of nodes), or any other values that may be mapped to such values.

While one of the objectives of embodiments of the present invention is to securely distribute keys to enable confidentiality to be provided for subsequent routing protocol messages in an ad hoc network, an underlying aim of embodiments of the invention is to ensure that the topology of the ad hoc network remains hidden from third parties who may wish to infiltrate or compromise the network. This assumes that the third party has not compromised any particular node, but is merely listening in on messages.

There are various possible forms of attack which might be used against an ad hoc network and it is not necessary to go into the details of these at this time. It is sufficient to say that a third party wishing to interfere with or infiltrate an ad hoc network may use a variety of different techniques, and embodiments of the present invention aim to mitigate any such possible attacks and to render the ad hoc network as secure as possible in the circumstances.

One particular form of attack, however, which embodiments of the present invention aim to guard against is when a node becomes compromised or controlled by a hostile party, providing having access to its key material, and can proceed to operate that node improperly, or to clone and impersonate that node, potentially indefinitely. The hostile party may then be able to disrupt the network operations via various attacks, such as traffic redirection, creating network wormholes or creating a network black hole. Clearly, such forms of attack could render the entire ad hoc network inoperable or at least substantially degraded.

The threat of an insider attack is potent, and is generally difficult to defend against. It is possible to make nodes which are tamper resistant or such that their keys are destroyed when the node is physically compromised. However, such techniques are difficult and not always possible to implement in practice, and may not be reliable if the node in question is not physically compromised.

An approach that may be used against an insider attack used is to identify a compromised node, by detecting unusual behaviour, or otherwise, and then to utilise a revocation mechanism to make sure that a nodes that is suspected to have been compromised is excluded from further network communications. This typically involves updating key material at other nodes in the network so that exclusion of the suspect node is enabled cryptographically. Embodiments of the present invention directly support this approach.

Embodiments of the present invention provide that an unrevoked node is able to determine the identity of nodes with which it can establish a two-way link in one hop. Furthermore, embodiments of the present invention aim to ensure that a node is able to securely transport a symmetric cryptographic key (LAK) to these nodes. Still further, embodiments of the present invention enable the distribution of additional routing protocol information, previously distributed by the local area node discovery procedure.

Embodiments of the present invention distribute local area keys (LAK), but without revealing any identity information of the nodes concerned. These local area keys are directional symmetric keys, which can then be used to protect subsequent routing messages using appropriate cryptographic mechanisms.

The subsequent routing messages are passed from one node to another. Since these local area keys will only be locally established, rather than globally, each node which receives a subsequent routing message must remove any cryptographic protection and then reapply it using an appropriate key that it shares with the intended recipient. That is, the local area keys are used on a local hop by hop basis.

Even if a third party could somehow learn details of the local area key (LAK) used for communications between any two given nodes, then that particular Local Area Key would only permit interception of communications in that local area of the network. If a node has any suspicion that this has taken place (i.e. interception), it can change its LAK and, in most cases, should do so on a regular basis anyway as a precaution.

Figure 2:
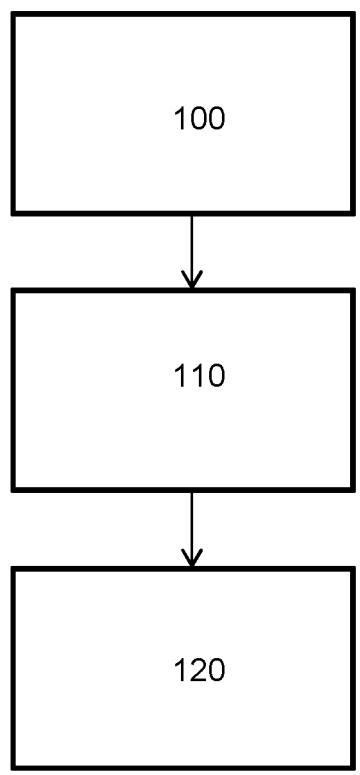
FIG. 2 shows the steps involved in sharing a key between 2 nodes in a network.

FIG. 2 shows the steps involved in setting up a shared key between 2 nodes.

To enable secure node discovery to occur, a broadcast encryption scheme is used to protect so-called ANNOUNCE messages. This message will also use a form of identity-based signature to authenticate the sender. The ANNOUNCE message is used by a node to signal its presence to other nodes in its neighbourhood. The broadcasting of an ANNOUNCE message is shown at step 100 of FIG. 2. This enables a node to safely broadcast information about its local view of the network whilst preventing external third parties from learning this view. Details of suitable broadcast encryption and identity based signatures schemes are given later. However, any cryptographic schemes that operate with embodiments of the present invention, or can be adopted to do so, may be used. An ANNOUNCE message can also carry additional information; this may be used, in some embodiments of this invention, to carry some information normally carried in other routing signalling messages, such as beacon messages.

A node B that receives and successfully decrypts an ANNOUNCE ciphertext will learn that the sending node A has received an earlier ANNOUNCE message from node B. This will trigger node B to attempt to establish a local area key with node A by sending to node A, a SHARE message, which is shown in step 110. Such a message will need to provide confidentiality for the transported local area, key, as well as integrity and data origin authentication. To efficiently and simultaneously achieve these differing security properties, an anonymous identity-based signcryption scheme is used.

Details of a suitable anonymous identity-based signcryption scheme are given later. However, any cryptographic scheme that operate with embodiments of the invention, or can be adopted to do so, may be.

In most practical situations, individual nodes will broadcast ANNOUNCE messages at periodic intervals. This is so that the changing nature of the nodes' local network views, caused by mobility and availability issues, are reflected in the network.

Each node will store node specific information which will enable that node to participate in the bootstrap protocol. The information stored in each node comprises a variety of different types of data. The different types of data include:

The public key (PK) shared by all nodes. The nodes will use a combination of cryptographic methods, and this public key is a combination of the public keys for all of those methods.

The node's identity (ID). This uniquely identifies the node. In an embodiment of the invention, the identity is a number chosen from the set $\{1, \ldots, N\}$ where N is the maximum possible number of nodes in the network. Other embodiments may use other forms of identity.

The node's private key (SK) corresponding to its identity. The nodes will use a combination of cryptographic methods, and this private key is a combination of the private keys for all of those methods.

The node's own local key (LAK) and a corresponding sequence number (seq) for that particular key. The node may change LAK and update seq at any time. It should always do so whenever any other node is revoked. This key will be distributed to neighbouring nodes in the network using SHARE messages and will be used to protect the routing protocol messages which are sent later using an authenticated symmetric encryption process. There are two possible approaches to protecting routing protocol messages. These are that the local area key will be used by neighbouring nodes to communicate to the node holding the key or the local area key will be used by the node holding the key to communicate to neighbouring nodes, i.e. a particular node will either decrypt incoming messages using its local area key or encrypt outgoing messages using its local area key. The choice between these approaches is a matter of choice in a particular embodiment. Either will work, as both source and destination nodes will know both local area keys.

The node's neighbour list (NL), consisting of a table of entries (ID', LAK', seq'), each of which identifies another node in the locality, its current local area key and its current local area key sequence number.

The node's neighbour candidate list (NCL), consisting of a table of identities representing those nodes from which the node has received a message but not yet established a 2 way link and a key. As well as a neighbour identity ID', each entry in NCL will additionally store a nonce RID' created by the recording node, and may also record a time after which this entry will be discarded.

A list REV of revoked user identities.

The protocol for distributing the local area key of a node to its neighbouring nodes uses two distinct message types, which will be referred to as ANNOUNCE and SHARE. It should be noted that the ANNOUNCE and SHARE messages may be transmitted in more than one part or, alternatively, may be concatenated with other messages, as required. For instance, a node sending a SHARE message, may concatenate it with its own ANNOUNCE message.

The ANNOUNCE messages are encrypted using the selected broadcast encryption scheme, containing as plaintext the identity ID of the sending node, its current sequence number seq, the signature ($\sigma$) of seq using the selected identity-based signature scheme, the list of node identities and nonces from the node's NCL, and any additional information RI that may be required in a particular embodiment. The target set S for the broadcast encryption is configured to a known set containing all non-revoked nodes in the network, thereby enabling any non-revoked node to decrypt the ciphertext. In an embodiment where identities are chosen from the set $\{1, \ldots, N\}$ it may be all non-revoked identities in this set.

SHARE messages are each created in direct response to a received ANNOUNCE message, if and only if the ANNOUNCE message contains an NCL entry for the ANNOUNCE message receiving (and SHARE message sending) node's identity ID'. A SHARE message consists of a concatenation of a nonce R and a ciphertext C, created using the selected anonymous identity-based signcryption scheme. The nonce R is that in the NCL entry in the ANNOUNCE message containing ID'.

A recipient of the SHARE message should attempt unsigncryption (step 120) only if R equals any RID' in its NCL, thereby allowing the recipient to deduce ID'. The ciphertext C in the SHARE message is a signcryption of the sequence number (seq) and LAK of the sender, authenticated using the signcryption associated data that consists of the nonce R.

Initially, all nodes are assumed to be unaware of the presence and identity of any of their neighbouring nodes. Therefore, initially, the neighbour list NL and the neighbour candidate list NCL of any node is empty. In order to populate these lists and to establish connections between nodes, the following protocol is followed. Each node will periodically broadcast an ANNOUNCE message containing its identity ID, its current sequence number seq, the signature ($\sigma$) of seq using the selected identity-based signature scheme, and its neighbour candidate list NCL. All of these items are encrypted using the broadcast encryption scheme. The signature σ may be precalculated, changed only when seq (and LAK) is changed. The transmission of the ANNOUNCE message acts as a beacon, advertising the presence of the node in the local area and also relaying information about which other nodes it is currently aware of.

Upon receiving an ANNOUNCE message containing a broadcast encryption ciphertext C, a node with identity ID decrypts C using its private key for the broadcast encryption scheme and the known target set S (excluding all revoked users in REV). If decryption succeeds, then the plaintext produced is parsed to yield an identity ID', a sequence number seq', a signature and a neighbour candidate list NCL'. The node then adds ID' and a fresh nonce RID' to its NCL if there is no entry in the NL containing ID', or if there is an entry in NL containing ID' with a sequence number lower than the present sequence number. For reasons of efficiency, these tests may be carried out before signature verification. The updated NCL will then be transmitted in the receiving node's next ANNOUNCE message.

If a node with identity ID receives an ANNOUNCE message which, after successful decryption, is found to contain an identity ID' and a list NCL' in which its own identity ID and a nonce RID appears, the node will first check whether ID' is contained in the list of revoked users. If this is the case, the node will take no further action. Otherwise, the node computes and broadcasts a SHARE message containing RID and a signcryption C of its sequence number seq and its local area key LAK, with authentication using the associated data of the nonce RID ID.

If a node with identity ID receives a SHARE message consisting of a nonce R and ciphertext C, it first checks if R is contained in its own NCL list, as the entry RID' associated with the identity ID'. If this is not the case, the node will do no further processing. Otherwise, the node attempts to unsigncrypt the ciphertext C using its anonymous identity-based signcryption private key and associated data of RID'. If unsigncryption fails, the node will do no further processing.

If unsigncryption succeeds, the node parses the resulting plaintext to yield seq' and LAK'. If the value of seq' is less than or equal to that currently stored in NL for the identity ID' then the node does no further processing. If the value of seq' is greater than that currently stored in NL for the identity ID' (or if there is no entry for the identity ID' in NL) then the node stores the tuple (ID', LAK', seq') in NL. Finally, the node removes the entry for identity ID' from NCL, since it is no longer a candidate, and is stored in NL. At this point, the nodes are each in possession of the local area key required for them to transmit encrypted messages between each other, and no third parties have been exposed to the key in clear.

By all nodes in an ad hoc network setting up shared keys in this way, it is possible to construct and maintain an ad hoc network in which messages between nodes are encrypted using a local area key known only to the respective transmitting and receiving nodes. This key will be know by other nodes in the local area, who will also be intended recipients of the same information, but not by other nodes or third parties. This provides a high level of security and ensures that the keys are kept confidential, minimising the risk of interception of messages by third parties.

While the main objective of the bootstrapping mechanism is to securely distribute local area keys to enable confidentiality to be provided for subsequent routing protocol messages in an ad hoc network, an aim of embodiments of this invention is to ensure that the topology of the established ad hoc network remains hidden from an adversary who has not compromised any of the participating nodes.

Leakage of topology-related information may come from the data link layer or the network layer of the ad hoc network, which may include addresses that leak identity and topology information.

A solution to this, applied at all relevant layers, is based on the fact that ANNOUNCE and SHARE messages require no additional address information, and can be sent to a broadcast address, and from a common address used by all nodes, or from a random address. For the encrypted routing signalling messages, any required encapsulating address information can be included in that encryption. This means that all routing signalling messages have to be decrypted by all possible recipients, even if the message need not be broadcast. However use of broadcast packets for most or all ad hoc routing protocol message is common, thus incurring no additional cost (beyond the decryption) in this case.

In the construction of a bootstrapping mechanism according to an embodiment of the invention, several cryptographic schemes are used; those so far identified are broadcast encryption, anonymous identity-based signcryption and identity-based signatures. Authenticated symmetric encryption is used for encrypting the routing signalling messages, and may be used as part of the implementation of other schemes, as will be described. Identity-based encryption may be used as part of the implementation of other schemes, as will be described.

First the three identified schemes are specified.

A (static) broadcast encryption scheme provides a sender with the ability to encrypt a message for a selected subset of receivers chosen from a set of all users. In such a scheme, a trusted authority generates a public key PK for a chosen set of possible users $\{1, 2, \ldots, N\}$. To identify users, the trusted authority assigns each user a unique identity id consisting of an index between 1 and N. The trusted authority will, for each user id, generate a secret key $sk_{id}^{be}$.

A broadcast encryption scheme is defined as one including the following algorithms:

Setup(λ, N): An algorithm that, given a security parameter λ and the maximum number of users N, returns a public key PK and, for each user id, a private key $sk_{id}^{be}$. This algorithm is run by the trusted authority.

Encrypt(PK, S, M): An algorithm that, given a public key PK, a target set S, and a message M, returns a ciphertext C. This algorithm is run by any user.

Decrypt($sk_{id}^{be}$, C): An algorithm that, given a private key $sk_{id}^{be}$ for a user id and a ciphertext C, returns either a message M or an error symbol ⊥ indicating that the ciphertext could not be decrypted using $sk_{id}^{be}$. This algorithm is run by the user id.

An identity-based signature scheme allows a user id with corresponding private key $sk_{id}^{ibs}$ to produce a publicly verifiable signature for a given message.

An identity-based signature scheme is defined as one including the following algorithms:

Setup(λ): An algorithm that, given a security parameter λ, returns a public key PK and a master secret msk. This algorithm is run by the trusted authority.

Extract(msk, id): An algorithm that, given the master secret msk and the identity id of a user, returns the private key $sk_{id}^{ibs}$ of the user. This algorithm is run by the trusted authority.

Sign(PK, $sk_{id}^{ibs}$, M): An algorithm that, given the public key PK, the private key $sk_{id}^{ibs}$ of a user with identity id, and a message M, returns a signature α. This algorithm is run by the user id.

Verify(PK, id, σ, M): An algorithm that, given the public key PK, a signer identity id, a purported signature σ, and a message M, returns either "accept" indicating that σ is deemed valid, or "reject".

A signcryption scheme simultaneously provides confidentiality, integrity and origin authentication of encrypted messages. An identity-based signcryption scheme does so in the identity-based setting, where users are identified by their identities rather than by their public keys.

An anonymous signcryption with associated data scheme hides both sender and receiver identities in the ciphertext, and the receiver will not be able to determine the identity of the sender of a ciphertext without successfully decrypting it. The ciphertext will not only authenticate the origin of the encrypted data but also the associated data (which is assumed to be available to the receiver in unencrypted form when the ciphertext is being decrypted).

An identity-based anonymous signcryption scheme with associated data is defined as one including the following algorithms:

Setup(λ): An algorithm that, given a security parameter λ, returns the public key PK and a master secret msk. This algorithm is run by the trusted authority.

Extract(msk, id): An algorithm that, given the master secret msk and the identity id of a user, returns the private key $sk_{id}^{sc}$ of the user. This algorithm is run by the trusted authority.

Signcrypt(PK, $id_s$, $sk_{id_s}^{sc}$, $id_r$, M, d): An algorithm that, given public key PK, the identity $id_s$ and private key $sk_{id_s}^{sc}$ of the sender, the identity $id_r$ of the receiver, a message M, and associated data d, returns a ciphertext C. This algorithm is run by the user with identity $id_s$.

Unsigncrypt(PK, $id_r$, $sk_{id_r}^{sc}$, C, d): An algorithm that, given the public key PK, the identity of the receiver $id_r$, the corresponding private key $sk_{id_r}^{sc}$, a ciphertext C, and associated data d, returns either the error symbol ⊥ or a tuple ($id_s$, m) consisting of the sender identity $id_s$ and a message M. This algorithm is run by the user with identity $id_r$.

An aim of a bootstrapping mechanism according to an embodiment of the present invention is to establish symmetric keys (called local area keys) that can be used to provide confidentiality of the subsequent routing messages. These are encrypted using an authenticated encryption scheme that ensures confidentiality and integrity of the routing messages.

An authenticated encryption scheme is defined as one including the following algorithms:

KeyGen(λ): An algorithm that, given a security parameter λ, selects a key K at random from $\{0, 1\}^\lambda$.

Encrypt(K, M): An algorithm that, given a key $K \in \{0, 1\}^\lambda$ and a message M, returns a ciphertext C.

Decrypt(K, C): An algorithm that, given a key $K \in \{0, 1\}^\lambda$ and a ciphertext C, returns either the error symbol ⊥ or a message M.

If it is decided, by some means, to revoke the node with identity id then the following steps are followed. Note that it is important that they are followed by all nodes in the network. Because they add id to REV, id will not be included in any future target set S. The means by which the decision to revoke a particular node is taken is beyond the scope of this application. However, such a decision may be taken on the basis of unusual behaviour related to a particular node.

1. Each other node adds id to REV, the list of revoked nodes' identities.
2. Each node removes the revoked node's information from its neighbour list NL (if it is in that list).
3. Each node refreshes its local area key LAK and increments its sequence number seq.

If a particular node (Node K) is to be revoked, then it is necessary for each other node in the ad hoc network to know this, since each node in the network should operate with the same set S of non-revoked users.

Once a node is informed by some means that node K is revoked, node K is added to the list REV of revoked nodes. Until each node which is a neighbour of node K updates its LAK, then node K could, in theory, still decrypt messages. This is why as part of the revocation process, all nodes should update their LAK and sequence number so that the revoked node is unable to participate in any communications, since it will be unable to decrypt any messages.

One or more nodes may be revoked at any one time, and the same procedure is applied to ensure that each revoked node is effectively removed from the ad hoc network.

In addition to the revocation of the node, meaning that a revoked node will not be able to participate in any future communications, it is advisable to delete or disregard an data or message originating from the revoked node, prior to its revocation. A decision to revoke is made based upon some objective criteria, and it could well be that messages sent by the node before revocation are potentially dangerous, in that they may include bogus or harmful information.

To know, with a degree of confidence, which information is received from which other nodes, in order that it can be correctly removed in this manner, an identity based signature scheme may be used. This may use the originating node's identity and may be attached to such data or messages, allowing their provenance to be determined.

Therefore, at the same time as revoking a particular node, the other nodes may be instructed to destroy any data or messages received from that node.

Anonymous signcryption can be implemented using an identity-based signature scheme (IBS), as described above, and an identity-based encryption scheme (IBE).

An identity-based encryption scheme is defined as one including the following algorithms:

Setup(λ): An algorithm that, given a security parameter λ, returns a public key PK and a master secret msk. This algorithm is run by the trusted authority.

Extract(msk, id): An algorithm that, given the master secret msk and the identity id of a user, returns the private key $sk_{id}^{ibe}$ of the user. This algorithm is run by the trusted authority.

Encrypt(PK, id, M): An algorithm that, given the public key PK, the identity id of a user and a message M, returns a ciphertext C. This algorithm is run by any user.

Decrypt(PK, $sk_{id}^{ibe}$, C): An algorithm that, given the public key PK, a private key $sk_{id}^{ibe}$ for a user id and a ciphertext C, returns either a message M or an error symbol ⊥ indicating that the ciphertext could not be decrypted using $sk_{id}^{ibe}$. This algorithm is run by the user id.

An anonymous signcryption scheme can then be constructed by:

Setup(λ): Use IBS. Setup (returning $PK_{IBS}$ and $msk_{IBS}$) and IBE.Setup (returning $PK_{IBE}$ and $msk_{IBE}$). PK is ($PK_{IBS}$, $PK_{IBE}$) and msk is $msk_{IBS}$, $msk_{IBE}$).

Extract(msk, id): Use IBS.Extract (returning $sk_{id}^{ibs}$) and IBE. Extract (returning $sk_{id}^{ibe}$). $sk_{id}^{sc}$ is ($sk_{id}^{ibs}$, $sk_{id}^{ibe}$)

Signcrypt(PK, $id_s$, $sk_{id_s}^{sc}$, $id_r$, M, d): Use IBS.Sign($PK_{IBS}$, $sk_{id_s}^{ibs}$,$id_r$|M|d) (returning σ) and IBE.Extract($PK_{IBE}$, $id_r$, $id_s$|M|σ) (returning C). Returns C.

Unsigncrypt(PK, $id_r$, $sk_{id_r}^{sc}$, C, d): Use IBE.Decrypt($sk_{id_r}^{ibe}$, C). If that returns ⊥ then return ⊥, otherwise parse return into $id_s$|M|σ and use IBS.Verify($PK_{IBS}$, $id_s$, $id_r$|M|d, σ). If that returns ⊥ then return ⊥, otherwise return ($id_s$, M).

Using the above, to implement embodiments of the invention requires the four schemes: broadcast encryption, identity-based signatures, identity-based encryption and authenticated symmetric encryption. (Identity-based anonymous signcryption can be constructed from these.)

Examples of authenticated symmetric encryption are well known to the skilled person. The remaining three schemes have realisations using a bilinear group, consisting of the following:

Cyclic groups $G_1$, $G_2$ and $G_T$ of prime order q.

A non-trivial asymmetric bilinear map e: $G_1 \times G_2 \rightarrow G_T$.

Realisations of such a bilinear group specific to a security parameter using elliptic curve groups are well-known to the skilled person.

In each of the following constructions, hash functions $H_k$ (for some values of k) each have their appropriate domain and codomain, specific to that construction, and will be well-known to the skilled person. In each construction g is a random element of $G_1$ and h is a random element of $G_2$, selected by the appropriate Setup algorithm. PK always includes all groups, functions, g and h; only additional elements are specified below. The cyclic group of order q is denoted $Z_q$. id is from $\{1, \ldots, N\}$.

A broadcast encryption scheme can be constructed, using an authenticated encryption scheme (AE), for target set S, by:

Setup(λ, N): Pick random α, γ∈$Z_q$. Compute $g_j=g^{\alpha^j}$ for j=1, 2, ..., 2N+1, v=$g^\gamma$ and z=e(g, h)$^{\alpha^{N+2}}$. PK includes all computed values. For a user id, $sk_{id}^{be}=(g_{id}^\gamma mh^{\alpha^{id}})$.

Encrypt(PK, S, M): Pick random t∈$Z_q$. Compute K=$H_2$(z), $C_0=h^t$, $C_1=(vg_1^{H_1(h_t)}\prod_{j \in S} g_{N+2-j})^t$, $C_2$=AE.Encrypt(K, M). C is ($C_0$, $C_1$, $C_2$).

Decrypt($sk_{id}^{be}$, C): Let $sk_{id}^{be}=(d_0, d_1)$. If $e(C_1, h) \neq e(vg_1^{H_1(C_0)}\prod_{j \in S} g_{N+2-j}, C_0)$ then return ⊥. Otherwise return AE.Decrypt($H_2(K)$, $C_2$), where $$K = \frac{e(C_1, d_1)}{e\left(d_1 g_{id+1}^{H_1(C_0)} \prod_{j \in S-\{id\}} g_{N+2-j+id}, C_0\right)}$$

An identity-based signature scheme can be constructed by:

Setup(λ): Pick random α∈$Z_q$. Compute z=e(g, h), $h_{pub}=h^\alpha$. PK includes z and $h_{pub}$.

Extract(msk, id): Compute $$sk_{id}^{ibs} = g^{\frac{1}{H_1(id)+\beta}} \in G_1.$$

Sign(PK, $sk_{id}^{ibs}$, M): Pick random r∈$Z_q$. Compute s=$z^r$, t=$H_2$(M, s)∈$Z_q$, u=$(sk_{id}^{ibs})^{r+t}$, and return (t, u).

Verify(PK, id, σ, M): Return "accept" if t=$H_2$(M, e(u, $h^{H_1(id)}h_{pub}$) $z^{-t}$), otherwise return "reject".

An identity-based encryption scheme can be constructed, using an authenticated encryption scheme (AE), by:

Setup(λ, N): Pick random β∈$Z_q$. Compute $g_{pub}=g^\beta$ and z=e(g, h). msk is β. PK includes $g_{pub}$ and z.

Extract(msk, id): Compute $$sk_{id}^{ibe} = h^{\frac{1}{H_1(id)+\beta}} \in G_2.$$

Encrypt(PK, id, M): Pick random s∈$\{0,1\}^{2\lambda}$. Compute r=$H_3$(s)∈$Z_q$, $C_0=(g_{pub}g^{H_1(id)})^r$, $C_1$=S⊕$H_2(z_r)$, $C_2$=AE.Encrypt($H_4$(s), M).

Decrypt(PK, $sk_{id}^{ibe}$, C): Compute t=e($C_0$, $sk_{id}^{ibe}$), s=$H_2$(t) ⊕$C_1$, r=$H_3$(s). If $C_0 \neq (g_{pub}g^{H_1(id)})^r$ then return ⊥. Otherwise return AE.Decrypt($H_4$(s), $C_2$).

By using embodiments of the present invention, it is possible to share a secret (secret information) without revealing details of the parties in clear. This allows an ad hoc network to be constructed and minimises the opportunity for an eavesdropping third party to intercept messages and learn about the identity of the individual nodes or the topology of the network.

Furthermore, if any one particular node is compromised, and this is detected an entity having suitable authority within the network, the ability of that node to participate in the ad hoc network can be revoked, meaning that it will no longer be able to decrypt any messages it receives. This advantageously allows individual nodes to be excluded from the ad hoc network as required, without requiring any physical access to the individual nodes to re-program them, since the revocation process, as well as the supply of keys, is managed by over the air signalling.

Figure 3:
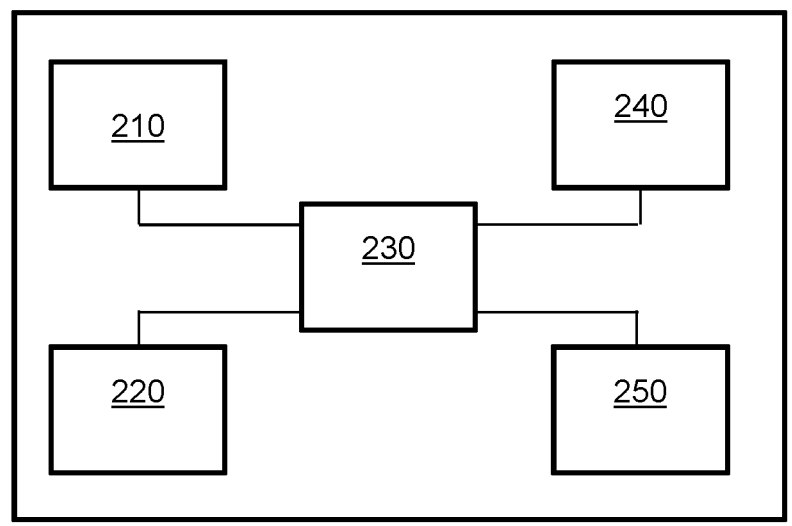
FIG. 3 shows a device according to an embodiment of the invention.

FIG. 3 shows a typical hardware embodiment of the present invention. As will be understood by the skilled person from the preceding description of embodiments of the invention, the hardware requirements are not essential and a variety of different hardware configurations may be used to implement embodiments of the invention. However, for the sake of completeness, FIG. 3 shows a wireless device 200, arranged to perform a method according to an embodiment of the present invention.

The device 200 is configured as a portable wireless data transmitter. It comprises a power source 210, such as a battery pack, which may be rechargeable and/or removable.

At the heart of the device 200 is processor 230, which is operably connected to the power source 210, memory store 250, User I/O unit 220 and communication unit 240.

The memory store 250 comprises digital memory for operating programs and storing data. It may comprises static and/or dynamic memory. It is also operable to store one or more keys used by embodiments of the invention.

The User I/O unit 220 is operable to receive commands from a user and to output information to the user. The commands may be received by key pad, individual buttons, a touch screen, voice activation, gestures or any other suitable input means. Information may be output to the user by a display, by audio output or any other suitable means of conveying information.

The device 200 is operable to communicate with other similar devices by means of a communication unit 240. In an embodiment, this is a wireless communication unit, operable to one or more suitable protocols, to transmit and receive information.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of establishing a network by sharing a secret between a first entity and a second entity, characterized by the steps of:
   the first entity broadcasting an ANNOUNCE message announcing its identity and a Neighbor Candidate List (NCL) containing details of other entities it is aware of but has not established a 2 way link and key with, said Neighbor Candidate List comprising an NCL entry in respect of each other entity, an NCL entry comprising a respective neighbor identity ID and associated nonce Reader Identifier (RID), the ANNOUNCE message being encrypted using a broadcast encryption scheme common to the first and second entities; and
   the second entity, upon receiving and decrypting the ANNOUNCE message, establishes if the broadcast ANNOUNCE message from the first entity contains an NCL entry in respect of the second entity, and, only if said ANNOUNCE message contains an NCL entry in respect of said second entity, creates and transmits to the first entity a SHARE message, wherein the SHARE message comprises a signcryption of the secret, authenticated using signcryption data associated with the nonce RID' associated with the second entity and included in said NCL entry in respect thereof.

2. The method according to claim 1, wherein the secret is a local area key (LAK), shared by the first and second entities and used for encrypting subsequent messages therebetween.

3. The method according to claim 1 wherein the secret is associated with a sequence number.

4. The method according to claim 3, wherein the sequence number is signed with a signature generated using an identity-based signature scheme.

5. The method according to claim 3, wherein the first entity, upon successful decryption of the SHARE message, stores in a Neighbor List (NL), details of the second entity, including its identity (ID), its local area key (LAK) and its sequence number.

6. The method according to claim 1, wherein each of the first and second entities stores information relating to identities of revoked entities, forbidden from participating in communications, wherein said revoked entities are not able to decrypt ANNOUNCE messages.

7. The method according to claim 6, further comprising a process for revoking an entity ID from a network wherein: each entity, other than an entity to be revoked, determines if the identity of the entity to be revoked is included within its details of other entities it is aware of and if the identity of the entity to be revoked is included within its Neighbor List subsequently removes the details of the entity to be revoked from its Neighbor List, refreshes a local area key (LAK), used for communication between respective entities, increments a sequence number, associated with the local area key, and removes the details of the entity to be revoked from its Neighbor Candidate List.

8. The method according to claim 7, wherein each entity, other than the entity to be revoked, deletes any messages or data received from the entity to be revoked prior to its revocation.

9. The method according to claim 1, wherein the SHARE message comprises an anonymous signcryption of the secret.

10. The method according to claim 9, wherein the SHARE message comprises an anonymous identity-based signcryption of the secret.

11. The method according to claim 1, wherein said first and second entities are each configured by a trusted authority with an identical public key (PK) and a private secret key (SK), each private secret key being specific to the entity to which it is configured.

12. The method according to claim 1, wherein said network is an ad hoc network comprised of a plurality of mobile entities, each entity configured to store a Neighbor List (NL) and a Neighbor Candidate List (NCL) in respect of other entities in its local area, and update said Neighbor List and Neighbor Candidate List in response to receipt and upon decryption of an ANNOUNCE message from another entity.

13. A non-transitory computer-readable storage medium storing a computer program or plurality of computer programs, the computer program or plurality of computer programs being arranged such that, when executed by a computer system or one or more processors, it/they cause the computer system or the one or more processors to carry out a method of establishing a network by sharing a secret between a first entity and a second entity, characterized by the steps of:
   the first entity broadcasting an ANNOUNCE message announcing its identity and a Neighbor Candidate List (NCL) containing details of other entities it is aware of but has not established a 2 way link and key with, said Neighbor Candidate List comprising an NCL entry in respect of each other entity, an NCL entry comprising a respective neighbor identity ID and associated nonce Reader Identifier (RID), the ANNOUNCE message being encrypted using a broadcast encryption scheme common to the first and second entities; and
   the second entity, upon receiving and decrypting the ANNOUNCE message, establishes if the broadcast ANNOUNCE message from the first entity contains an NCL entry in respect of the second entity, and, only if said ANNOUNCE message contains an NCL entry in respect of said second entity, creates and transmits to the first entity a SHARE message, wherein the SHARE message comprises a signcryption of the secret, authenticated using signcryption data associated with the nonce RID associated with the second entity and included in said NCL entry in respect thereof.

* * * * *